(12) United States Patent
Arora et al.

(10) Patent No.: US 11,368,913 B2
(45) Date of Patent: Jun. 21, 2022

(54) BASEBAND POWER ESTIMATION AND FEEDBACK MECHANISM

(71) Applicant: Apple Inc., Cupertino, CA (US)

(72) Inventors: Sunny Arora, San Jose, CA (US); Rati Agrawal, Santa Clara, CA (US); Sami M. Almalfouh, San Jose, CA (US); Xiantao Sun, Sunnyvale, CA (US); Johnson O. Sebeni, Fremont, CA (US); Wael S. Barakat, San Jose, CA (US); Navid Damji, Cupertino, CA (US); Srinivas Pasupuleti, San Jose, CA (US); Raghuveer Mallikarjunan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/437,127

(22) Filed: Jun. 11, 2019

(65) Prior Publication Data

US 2019/0297569 A1 Sep. 26, 2019

Related U.S. Application Data

(63) Continuation of application No. 16/241,107, filed on Jan. 7, 2019, now Pat. No. 10,341,957, which is a
(Continued)

(51) Int. Cl.
*H04W 52/02* (2009.01)
*H04W 72/04* (2009.01)
*H04W 88/02* (2009.01)

(52) U.S. Cl.
CPC ..... *H04W 52/028* (2013.01); *H04W 52/0251* (2013.01); *H04W 72/042* (2013.01); *H04W 88/02* (2013.01); *Y02D 30/70* (2020.08)

(58) Field of Classification Search
CPC ............. H04W 88/02; H04W 52/0251; H04W 52/028; H04W 72/042; H04W 88/06; H04W 52/0209; H04W 40/06
See application file for complete search history.

(56) References Cited

U.S. PATENT DOCUMENTS 7,130,365 B2 10/2006 Li
8,218,690 B1 7/2012 Zhang
(Continued)

*Primary Examiner* — Keith Ferguson
(74) *Attorney, Agent, or Firm* — Kowert, Hood, Munyon, Rankin & Goetzel, P.C.

(57) ABSTRACT

This disclosure relates to techniques for estimating baseband power consumption and using the baseband power consumption estimation to select baseband operation features. According to some embodiments, one or more baseband power consumption modifiers occurring during an estimation window may be identified. Baseband power consumption of the wireless device during the estimation window may be estimated based on the identified baseband power consumption modifiers occurring during the estimation window. Baseband data throughput of the wireless device during the estimation window may also be estimated. One or more baseband operation characteristics may be selected based at least in part on the estimated baseband power consumption during the estimation window, possibly in conjunction with the estimated baseband data throughput during the estimation window, current wireless medium conditions, and/or other considerations.

20 Claims, 9 Drawing Sheets

Related U.S. Application Data continuation of application No. 15/838,580, filed on Dec. 12, 2017, now Pat. No. 10,200,957, which is a continuation of application No. 15/169,280, filed on May 31, 2016, now Pat. No. 9,860,848.

(56) References Cited

U.S. PATENT DOCUMENTS

| | | |
|---|---|---|
| 8,965,718 B2 | 2/2015 | Zimmermann et al. |
| 9,042,289 B2 | 5/2015 | De Chanterac |
| 9,400,541 B2 | 7/2016 | Zimmermann et al. |
| 2003/0050104 A1 | 3/2003 | Matsumura et al. |
| 2007/0092045 A1 | 4/2007 | Woo |
| 2008/0057894 A1* | 3/2008 | Aleksic .............. H02J 9/002 455/187.1 |
| 2009/0207794 A1* | 8/2009 | Meylan ............. H04W 76/28 370/329 |
| 2010/0062800 A1 | 3/2010 | Gupta |
| 2011/0153805 A1* | 6/2011 | Beninghaus ....... H04B 17/309 709/224 |
| 2011/0256838 A1 | 10/2011 | Donovan |
| 2012/0129564 A1 | 5/2012 | De La Cropte De Chanterac |
| 2012/0149424 A1* | 6/2012 | Dawid ............... H04B 7/0877 455/522 |
| 2012/0207040 A1* | 8/2012 | Comsa ............ H04W 72/1215 370/252 |
| 2012/0287831 A1* | 11/2012 | Cheng .............. H04W 52/028 370/311 |
| 2013/0045744 A1 | 2/2013 | Dimpflmaier et al. |
| 2013/0067263 A1 | 3/2013 | Liu |
| 2013/0210481 A1* | 8/2013 | Sane .................. H04W 48/18 455/552.1 |
| 2013/0217386 A1 | 8/2013 | Perets |
| 2014/0274009 A1 | 9/2014 | Do |
| 2014/0364174 A1 | 12/2014 | Vyas et al. |
| 2015/0208345 A1* | 7/2015 | Weissman ........ H04W 52/0209 455/574 |
| 2015/0257118 A1 | 9/2015 | Siomina |
| 2015/0289205 A1 | 10/2015 | Kim et al. |
| 2015/0295797 A1* | 10/2015 | Kneckt ........... H04W 56/0045 370/252 |
| 2016/0192296 A1* | 6/2016 | Rehan ............... H04L 65/604 455/574 |
| 2016/0233989 A1 | 8/2016 | Belghoul |
| 2016/0366626 A1* | 12/2016 | Krishnamoorthy ... H04W 24/08 |
| 2017/0084155 A1* | 3/2017 | Mese ............... H04M 1/72519 |
| 2017/0118715 A1 | 4/2017 | Bhattacharya |

* cited by examiner

BASEBAND POWER ESTIMATION AND FEEDBACK MECHANISM

PRIORITY CLAIM

This application is a continuation of Ser. No. 16/241,107 titled "Baseband Power Estimation and Feedback Mechanism" and filed Jan. 7, 2019, whose inventors are Sunny Arora, Rati Agrawal, Sami M. Almalfouh, Xiantao Sun, Johnson O. Sebeni, Wael S. Barakat, Navid Damji, Srinivas Pasupuleti, Raghuveer Mallikarjunan, which is a continuation of Ser. No. 15/838,580 titled "Baseband Power Estimation and Feedback Mechanism" and filed Dec. 12, 2017, now U.S. Pat. No. 10,200,957 whose inventors are Sunny Arora, Rati Agrawal, Sami M. Almalfouh, Xiantao Sun, Johnson O. Sebeni, Wael S. Barakat, Navid Damji, Srinivas Pasupuleti, Raghuveer Mallikarjunan, which is a continuation of Ser. No. 15/169,280 titled "Baseband Power Estimation and Feedback Mechanism" and filed May 31, 2016, now U.S. Pat. No. 9,860,848, whose inventors are Sunny Arora, Rati Agrawal, Sami M. Almalfouh, Xiantao Sun, Johnson O. Sebeni, Wael S. Barakat, Navid Damji, Srinivas Pasupuleti, Raghuveer Mallikarjunan, and which are both hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to systems, methods, and apparatuses for estimating baseband power usage and using that information for baseband operation decision making.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Many wireless communication technologies, such as cellular communication technologies, are substantially designed to provide mobile communication capabilities to wireless devices, such as cellular phones. Accordingly, wireless devices are generally powered by a portable power supply, e.g., a battery. As batteries hold a finite charge, the balance between techniques that reduce power consumption to improve battery life, and techniques that provide higher throughput, commonly results in less-than-ideal design trade-offs for wireless devices. Thus, improvements in the field would be desirable.

SUMMARY

Embodiments are presented herein of, inter alia, systems, methods, and apparatuses for estimating baseband power usage in a wireless device and for utilizing the estimated baseband power usage information during baseband operations.

According to the techniques descried herein, a wireless device may be provided with the capability to estimate its baseband power usage in real time, through knowledge of the system and characterization (e.g., via a series of characterization tests) of the effects on baseband power consumption of the various baseband features and characteristics (e.g., configuration settings) of the system.

According to some embodiments, an additive model may be used, such that the baseband power consumption is estimated by computing a linear combination of whichever power modifying characteristics features are identified as being active during an estimation window.

The estimated baseband power consumption computed in such a way may be used within and/or outside of the baseband portion of the wireless device. For example, the estimated baseband power consumption (and/or one or more metrics derived therefrom) may be used as a feedback input for baseband operations, such that certain baseband operation characteristics (e.g., features turned on or off, timing of certain operations) may be selected or modified based at least in part on the estimated baseband power consumption. Alternatively or in addition, the estimated baseband power consumption (and/or one or more metrics derived therefrom) may be provided to higher layers (e.g., to one or more applications or other modules operating on an application processor/domain of the wireless device), and may be used as part of their operations (e.g., for determining network data exchange timing, for providing a power consumption meter or battery level user interface, etc.)

Note that the techniques described herein may be implemented in and/or used with a number of different types of devices, including but not limited to, base stations, access points, cellular phones, portable media players, tablet computers, wearable devices, and various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
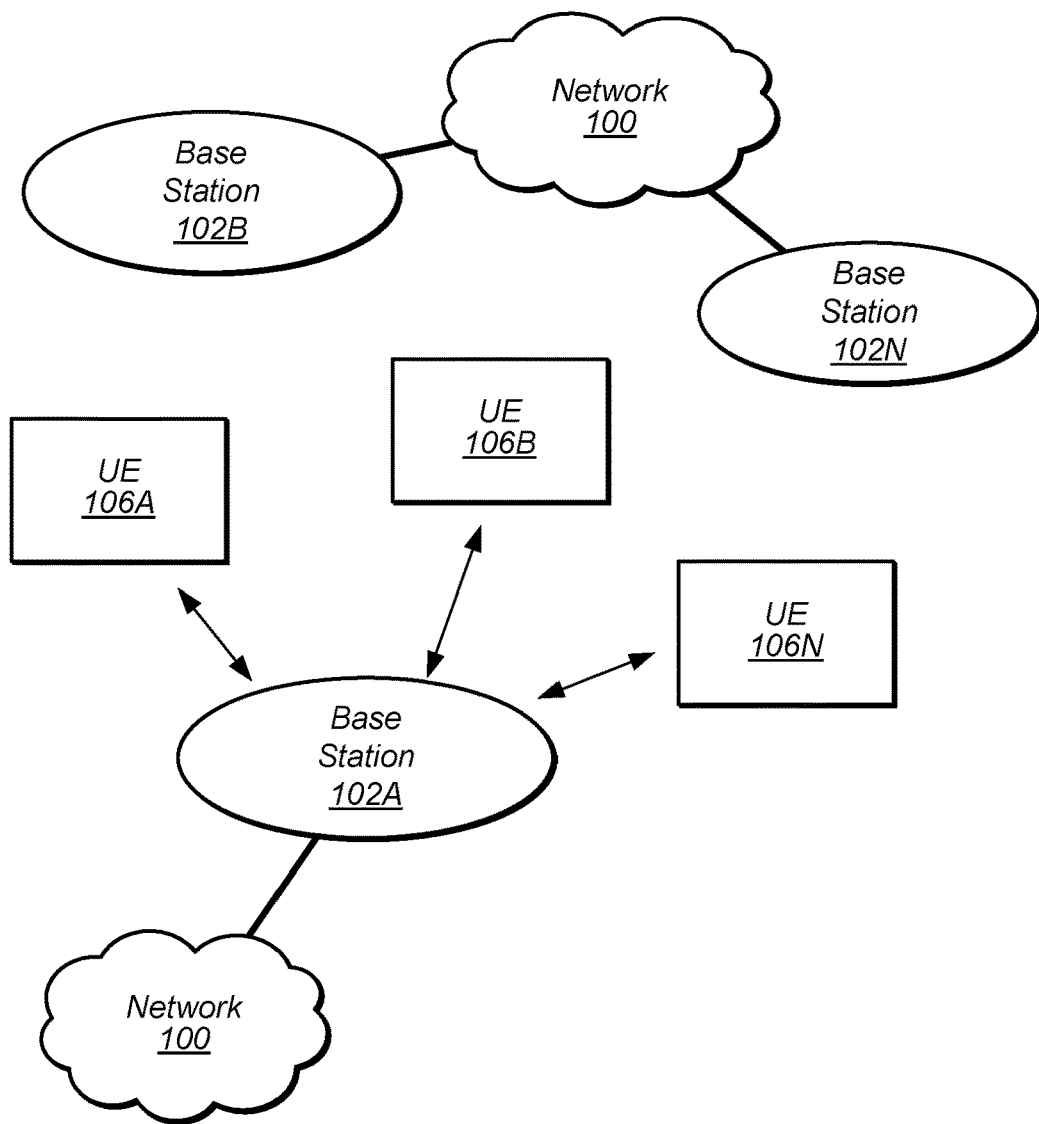
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Base Station—The term "Base Station" has the full breadth of its ordinary meaning, and at least includes a wireless communication station installed at a fixed location and used to communicate as part of a wireless telephone system or radio system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
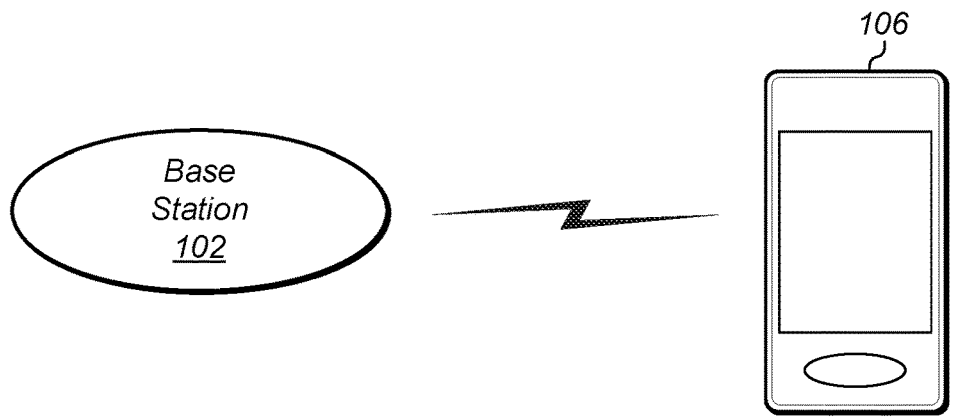
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication among the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), HSPA 3GPP2 CDMA2000 (e.g., 1×RTT, NEV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or UMTS or GSM), and separate radios for communicating using each of Wi-Fi and Bluetooth. Other configurations are also possible.

Figure 3:
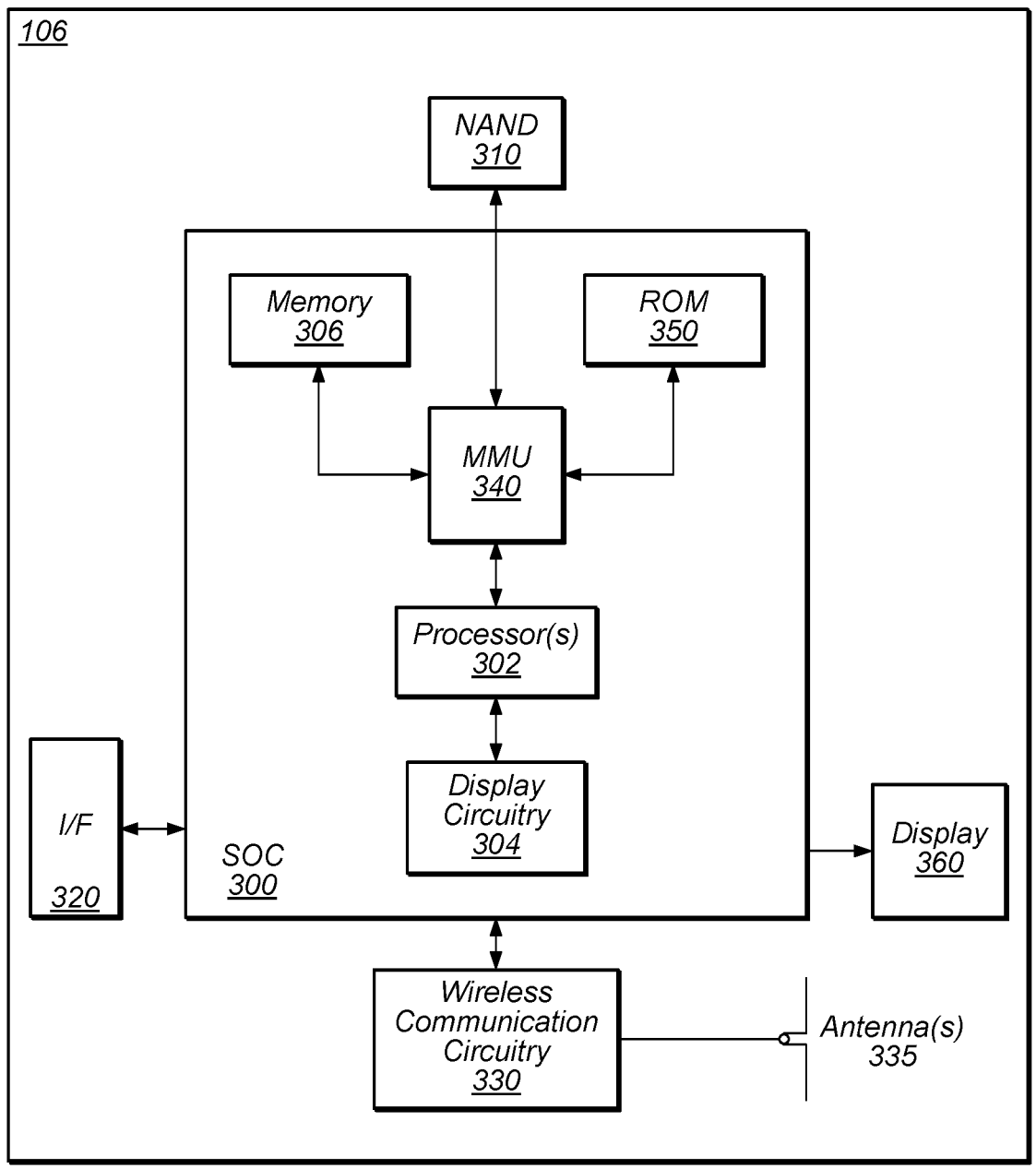
FIG. 3 illustrates an exemplary block diagram of a UE device, according to some embodiments.

FIG. 3—Exemplary Block Diagram of a UE Device

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., baseband processor, radio(s), etc.) 330 (e.g., for LTE, Wi-Fi, GPS, etc.).

The UE device 106 may include at least one antenna, (and possibly multiple antennas, e.g., for MIMO and/or for implementing different wireless communication technologies, among various possibilities) performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features for estimating baseband power consumption and using the baseband power consumption estimation during baseband operations, such as those described herein with reference to, inter alia, FIG. 5. A baseband processor comprised in wireless communication circuitry 330 of the UE device 106 may be configured to implement part or all of the methods described herein, e.g., by executing program instructions stored on a memory medium (e.g., a non-transitory computer-readable memory medium). In other embodiments, the baseband processor comprised in wireless communication circuitry 330 may be configured as a programmable hardware element, such as an FPGA (Field Programmable Gate Array), or as an ASIC (Application Specific Integrated Circuit). Alternatively (or in addition) the baseband processor comprised in wireless communication circuitry 330 of the UE device 106, in conjunction with one or more of the other components 300, 302, 304, 306, 310, 320, 335, 340, 350, 360 may be configured to implement part or all of the features described herein, such as the features described herein with reference to, inter alia, FIG. 5.

Figure 4:
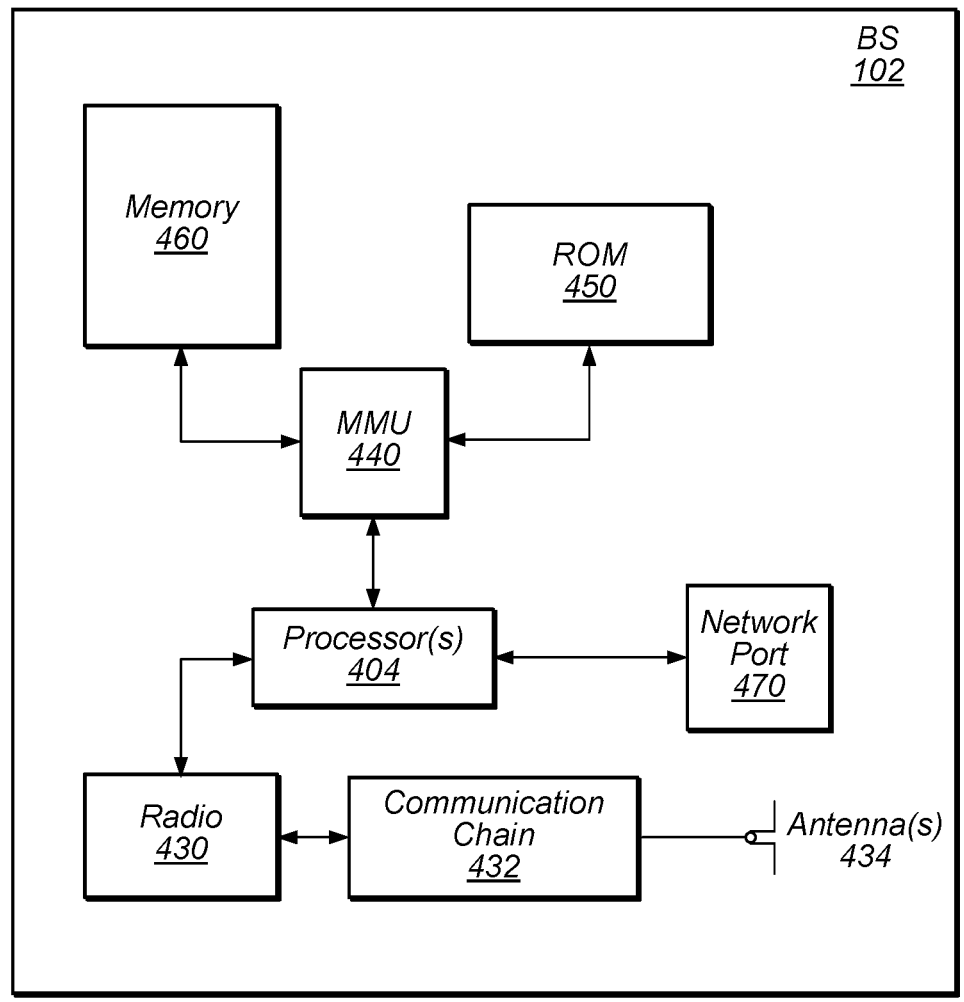
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

The BS 102 may include hardware and software components for implementing or supporting implementation of features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein.

Figure 5:
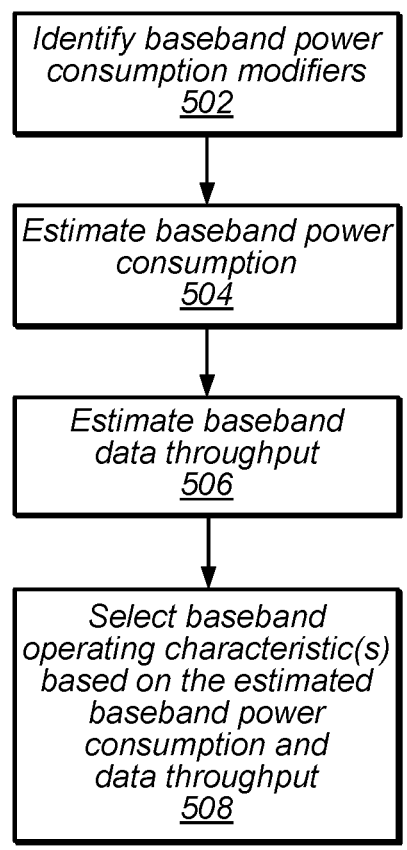
FIG. 5 is a flowchart diagram illustrating an exemplary method for a wireless device to estimate baseband power consumption and to use the baseband power consumption estimation during baseband operations, according to some embodiments.

FIG. 5—Flowchart Diagram

Determining how to balance the relative emphasis between throughput and power consumption for a wireless device, in order to provide good user experience, can be a difficult problem. In many instances it may be possible to select whether to use techniques that may provide improved throughput at higher power consumption cost, or to use techniques that have a lower power consumption cost, but may provide lesser throughput.

Accordingly, it may be possible to improve performance efficiency in such instances if accurate information is available for determining which of multiple possible techniques or features to use at which times to provide more power usage efficient baseband operation. For example, if a wireless device is not able to intelligently determine how much benefit a power consuming but potentially performance enhancing feature will provide, the potentially performance enhancing feature may be selected on some occasions when its benefits would be minimal, such that the additional power consumption caused by the feature may be of little or no benefit. On such occasions the wireless device might thus potentially unknowingly operate with lower power usage efficiency with respect to data throughput than if the feature were not enabled.

One type of information that may be useful in making such decisions may include a real-time estimation of baseband power consumption, e.g., based on the features and characteristics of baseband operation that are currently active. Accordingly, it would be useful to provide techniques for estimating baseband power consumption, and for using that information to improve baseband operations. FIG. 5 is a flowchart diagram illustrating such a scheme. The scheme shown in FIG. 5 may be used in conjunction with any of the computer systems or devices shown in the above Figures, among other devices. According to some embodiments, the method may be implemented by a wireless device (e.g., a UE 106 such as illustrated in and described with respect to FIGS. 1-3). In various embodiments, some of the elements of the scheme shown may be performed concurrently, in a different order than shown, substituted for by other elements, or may be omitted. Additional elements may also be performed as desired. As shown, the scheme may operate as follows.

In 502, one or more baseband power consumption modifiers (e.g., characteristics or features of baseband operation) active during an estimation window may be identified. The active baseband power consumption system modifiers may be identified from a multitude of possible power usage modifiers, that may be known based on knowledge of the system design of the wireless device. For example, the possible set of baseband power consumption system modifiers may include and/or be based on various hardware modules, software modules, clocking mechanisms, voltage schemes, power optimization features, etc.

Each possible baseband power usage modifier may be characterized by its typical effect on baseband power consumption while active. For example, a series of characterization tests may be performed to determine the typical individual power consumption contribution of each of the possible baseband power usage modifiers, and the wireless device may store information indicative of the power consumption contribution per unit time (e.g., as determined by the characterization tests) for each such possible baseband power usage modifier. Other ways of characterizing the typical effect of each possible baseband power consumption modifier on baseband power consumption while active are also possible.

According to some instances, the wireless device may also determine what portion of the estimation window each modifier is/was active, if not active for the entire estimation window. Or more generally, the wireless device may determine an amount of time during the estimation window for which each identified baseband power usage modifier was active. This may be useful to more accurately estimate the baseband power consumption during the estimation window, e.g., as further described below herein.

As noted above, the possible set of baseband power consumption modifiers may include any of a great variety of features and/or modules that may be used at various times during baseband operation. As a non-limiting set of example possible baseband power consumption modifiers, any or all of the following possible baseband power consumption modifiers may be characterized and may be identified when active during an estimation window, as desired.

As one possible modifier, a radio access technology (RAT) that is currently active (e.g., whether the wireless device is using LTE, WCDMA, GSM, CDMA2000, TDSCDMA, etc.) may be considered as a baseband power consumption modifier. As another possibility, a state (e.g., packet switched (PS) connected mode, a circuit switched (CS) connected mode, a multi-radio access bearer (mRAB) connected mode, an idle mode, a VoLTE call, etc.) and/or procedure (e.g., a random access channel (RACH), a forward access channel (FACH), a high-speed FACH (HS-FACH), etc.) undertaken by the wireless device with respect to a RAT that is currently active may be considered as a baseband power consumption modifier.

Still further possible modifiers could include features/characteristics used while in a particular state and/or performing a particular procedure according to a RAT, such as the bandwidth used, transport block size allocated, the downlink and uplink allocations, the transmit power (e.g., power amplifier level) used, whether carrier aggregation/dual carrier is enabled or disabled, whether an advanced receiver functionality (e.g., providing interference mitigation functionality) is enabled or disabled, a diversity path used, whether continuous packet connectivity (CPC) is active, a discontinuous reception (DRX) configuration, etc.

Additionally, possible baseband power consumption modifiers not specifically related to any particular RAT may be considered, if desired. For example, system selection related baseband power consumption modifiers, such as if the wireless device is currently out-of-service (OOS) (and potentially further whether a searcher module is active or inactive), engaging in power-up procedures, or performing a background public land mobile network (BPLMN) scan, among various possibilities, could be among the possible baseband power consumption modifiers characterized.

In 504, baseband power consumption of the wireless device during the estimation window may be estimated. As one possibility, this may include calculating a linear combination of the effects on baseband power consumption of the identified baseband power consumption modifiers. For example, a baseband power consumption value may be calculated for each respective baseband power consumption modifier identified as active during the estimation window, e.g., by multiplying the power usage per unit time of the respective baseband power consumption modifier by the amount of time during the estimation window that the respective baseband power consumption modifier was active. The baseband power consumption values for all of the baseband power consumption modifiers identified as active during the estimation window may then be summed to calculate a total estimated baseband power consumption during the estimation window. Alternatively, any of various other functions for applying the modifier effects (e.g., depending on the manner in which the effects of the set of possible baseband power consumption modifiers on baseband power consumption are characterized) to generate the baseband power consumption estimate, as desired.

In 506, baseband data throughput of the wireless device during the estimation window may be estimated or calculated. The baseband data throughput may be estimated separately as downlink throughput (e.g., an amount of data wirelessly received by the wireless device) and uplink throughput (e.g., an amount of data wirelessly transmitted by the wireless device), and/or may be estimated as a combined uplink and downlink (i.e., total) throughput (e.g., the amount of data both wirelessly transmitted and wirelessly received by the wireless device).

According to some embodiments, the baseband data throughput and the baseband power consumption for the estimation window may be used to calculate one or more estimated energy used per data communicated (e.g., in units of mA/bit, µA/bit, mA/byte, or any other desired unit) values for the estimation window. For example, the estimated baseband power consumption may be divided by the total baseband data throughput for the estimation window to determine an overall estimated energy used per data communicated value for the estimation window. If desired, separate energy used per uplink data communicated and/or energy used per downlink data communicated values may also be estimated.

Note that the estimation window size used for the baseband power consumption estimation, the baseband data throughput estimation(s), and/or the energy used per data communicated estimation(s) may be any desired window size. According to some embodiments, a new estimation window (e.g., having the same or a different length) may succeed each previous estimation window, such that estimation windows may occur continuously for continuous real-time baseband power consumption estimation. The estimated baseband power consumption, baseband data throughput, and/or energy used per data communicated may be accumulated over multiple estimation windows to obtain estimates over a longer period of time.

Alternatively, or in addition, the estimated baseband power consumption, baseband data throughput, and/or energy used per data communicated may be averaged over any of various possible averaging windows, using any of various averaging techniques.

As a still further possibility, selective estimated baseband power consumption, baseband data throughput, and/or energy used per data communicated values specific to certain features or characteristics of baseband operation may be calculated, e.g., using estimated values from those estimation windows in which the feature(s) and/or characteristic(s) of interest were active. For example, it may be possible to estimate energy usage for specific states (e.g., connected mode, PS only, VoLTE only, etc.), which may be useful for selecting operating characteristics when in those states and/or determining when to operate in those states, to flag high power consumption periods for debugging and/or error detection, and/or for any of various other possible purposes.

According to some embodiments, sample values for baseband power consumption and baseband data throughput, along with associated sample values for other types of data, such as load conditions, wireless medium conditions, location, time of day, etc., during the estimation window in which a baseband power consumption sample value and a baseband data throughput sample value were collected, may be collected over time. Thus, the wireless device may store associated historical value samples for any or all of baseband power consumption, baseband data throughput, load conditions, wireless medium conditions, location, time, and/or any of various other possible types of data desired.

Such historical value samples may be used to model the estimated energy cost of transmitting data under a variety of circumstances, e.g., using a learning algorithm implemented by the wireless device. For example, an energy cost table may be generated, which indicates what the estimated energy used per data communicated cost would be under various possible combinations of conditions (e.g., load condition/wireless medium condition/location/time combinations). If the relative energy contributions of uplink and downlink data can be determined, it may further be possible to model uplink energy costs (e.g., in an uplink energy cost table or other model) and/or downlink energy costs (e.g., in a downlink energy cost table or other model).

As new value samples are obtained, the learning algorithm may occasionally update the energy cost table or other model, e.g., periodically and/or as the new data becomes available, based on the new value samples for baseband power consumption, baseband data throughput, load conditions, wireless medium conditions, location, time, etc. According to some embodiments, there may be a filtering mechanism, e.g., that emphasizes newer value samples while still considering older value samples, as part of each model update.

In 508, one or more baseband operating characteristics may be selected based at least in part on the estimated baseband power consumption and the estimated data throughput during the estimation window. If desired, an current estimated energy used per data communicated value(s) (e.g., that is/are calculated from the estimated baseband power consumption and the estimated data throughput) and/or an estimated energy cost of transmitting data under the current conditions (e.g., that is derived from an energy cost table or other model for energy costs under various conditions generated by a learning algorithm) may be used as part of the baseband operating characteristics selection. According to some embodiments, values for any or all of these metrics may be provided as a sort of feedback to a power controlling baseband module, e.g., a "power controller".

The power controller module may decide to enable/disable (turn on/off) and/or vary configuration parameters for certain baseband blocks/modules, e.g., for more efficient operation, based on the current (e.g., from the most recent estimation window or an average over multiple recent estimation windows) baseband power consumption, baseband throughput, and/or energy used per data communicated. Examples of features or modules that might be turned on/off based at least in part on the estimated baseband power consumption, estimated data throughput, and/or estimated energy used per data communicated, could include an advanced receiver function that implements interference mitigation/cancellation techniques, a carrier aggregation feature that increases the amount of bandwidth that can be used for wireless communication, and/or any of various other features, some or all of which may be expected to provide throughput gains at a cost of increased power consumption. For example, the previously discussed advanced receiver function that implements interference mitigation/cancellation techniques might be enabled when estimated energy used per data communicated is high (e.g., above a certain threshold), as this may indicate that there may be room to improve energy efficiency by enabling the feature, and disabled when estimated energy used per data communicated is low (e.g., below a certain threshold), as this may indicate that energy efficiency is already good, and enabling this feature might reduce energy efficiency by increasing power consumption more than would be justified by possible throughput gains.

As another possibility, the baseband operating characteristics selected could include timing of when to perform certain baseband operation. For example, certain (e.g., delay tolerant) data transactions could be deferred when estimated current energy used per data communicated and/or estimated energy cost of transmitting data under the current conditions is high (e.g., above a certain threshold), and performed when estimated current energy used per data communicated and/or estimated energy cost of transmitting data under the current conditions is low (e.g., below a certain threshold).

Additionally, in some instances, baseband operations may be indirectly affected by the estimated current energy used per data communicated and/or estimated energy cost of transmitting data under the current conditions. As one such possibility, such metrics may be provided to one or more applications that are currently performing or may perform network data exchange (e.g., in response to a request and/or based on preconfigured agreement), which may in turn base some or all of its network data exchange related decisions (e.g., when to initiate a new communication session, whether to pause or halt a communication session, etc.) at least in part on the estimated energy cost of transmitting data under the current conditions. For example, an application might calculate an energy cost estimation of a new communication session, and determine to initiate the new communication session if the estimated energy cost is below a certain threshold, and not to initiate the new communication session if the estimated energy cost is above a certain threshold.

According to some embodiments, the estimated baseband power consumption may also or alternatively be used for one or more other purposes than as a feedback mechanism affecting baseband operations. For example, the estimated baseband power consumption may be used (e.g., alone or in combination with other considerations) as part of estimating the remaining battery life of the wireless device. As another possibility, estimated baseband power consumption related information may be presented via one or more user interface features, e.g., to inform a user of the wireless device of current baseband power consumption related characteristics. For example, indications of any or all of estimated remaining battery life, current or historical estimated baseband power consumption or estimated energy used per data communicated, estimated energy cost of transmitting data under the current conditions, and/or any of various other types of information related to the estimated baseband power consumption of the wireless device may be presented via a display, a speaker, and/or any of various other possible user interface elements.

FIGS. 6-10

FIGS. 6-10 and the description thereof are provided by way of example, and are not intended to be limiting to the disclosure as a whole. Numerous alternatives to and variations of the details provided herein below are possible and should be considered within the scope of the present disclosure.

Figure 6:
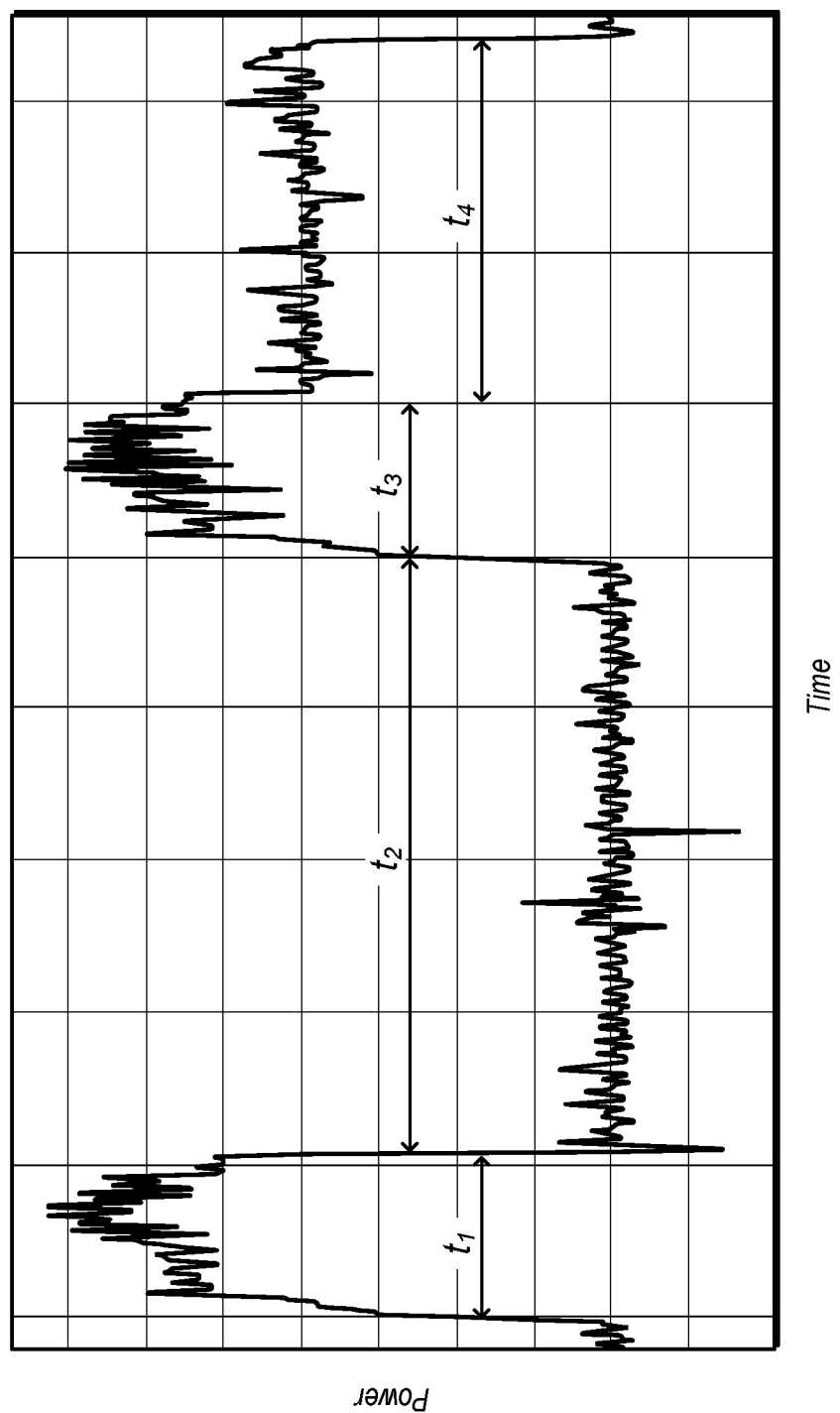
FIG. 6 is a graph illustrating aspects of an example framework for estimating baseband power consumption, according to some embodiments.

FIG. 6 is a graph illustrating exemplary baseband power consumption characteristics that can be considered when modelling baseband power consumption, according to some embodiments. As shown, within each of several periods of time (e.g., $t_1$, $t_2$, $t_3$, $t_4$) during the total time sample, baseband power consumption may be relatively stable, although the baseband power consumption differs between the different periods of time. The differences in power consumption for the different time periods $t_1$, $t_2$, $t_3$, $t_4$ may be attributed to different features (e.g., baseband power consumption modifiers) being active during each of the periods of time $t_1$, $t_2$, $t_3$, $t_4$. Thus, it may be possible to model the power consumption during each time period $t_1$, $t_2$, $t_3$, $t_4$ as a linear combination of the individual contributions to power consumption of each of those features active in each of those time periods. For example, the power consumption during the periods $t_1$ and $t_3$ might be represented by a linear combination of the power consumption by two active features ($P_{f1}+P_{f2}$), while the power consumption during the period $t_2$ might be represented by the power consumption by a single active feature ($P_{f3}$), and the energy consumption during the period $t_4$ might similarly be represented by a single (though different) active feature ($P_{f4}$). In this case, the total energy used during the illustrated sample might be modeled as:

$$E_{total}=(P_{f1}+P_{f2})(t_1+t_3)+P_{f3}t_2+P_{f4}t_4$$

By characterizing the power consumption contribution of each feature/characteristic of a set of possible features and characteristics using actual baseband power consumption measurements with various individual features and combinations of features active, it may be possible to use such a model to estimate the baseband power consumption based on which baseband features and characteristics are active without actually measuring the baseband power consumption.

Figure 7:
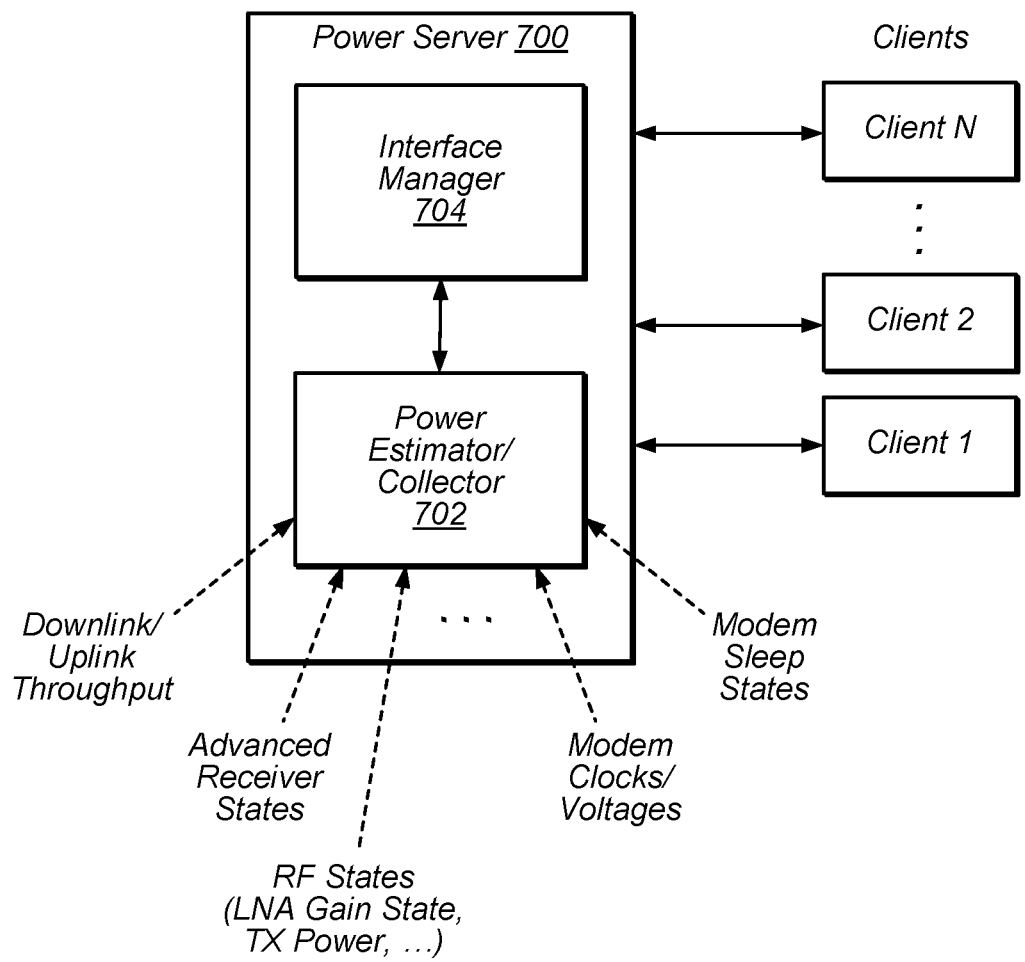
FIG. 7 is an exemplary block diagram illustrating a possible logical model for estimating baseband power consumption, according to some embodiments.

FIG. 7 is a block diagram illustrating an example of a possible logical model for estimating baseband power consumption, according to some embodiments. As shown, a power estimator/collector module 702 executing within a power server module 700 may receive information from various baseband sources regarding possible baseband features and characteristics that may act as baseband power consumption modifiers. For example, as shown, downlink/uplink throughput information, advanced receiver states, RF states (e.g., low noise amplifier (LNA) gain state, transmit power), modem clocks/voltages, modem sleep states, and/or any of various other baseband features and characteristics may be reported to the power estimator/collector 702. The power estimator/collector may estimate current baseband power consumption (and possibly also the current power consumption per data communicated, e.g., based on the current baseband power consumption and the downlink/uplink throughput). An interface manager 704 may provide an interface between the power estimator/collector 702 and one or more clients (e.g., client 1, client 2 . . . client N), each of which may request the baseband power consumption estimation and/or one or more values derived therefrom.

Figure 8:
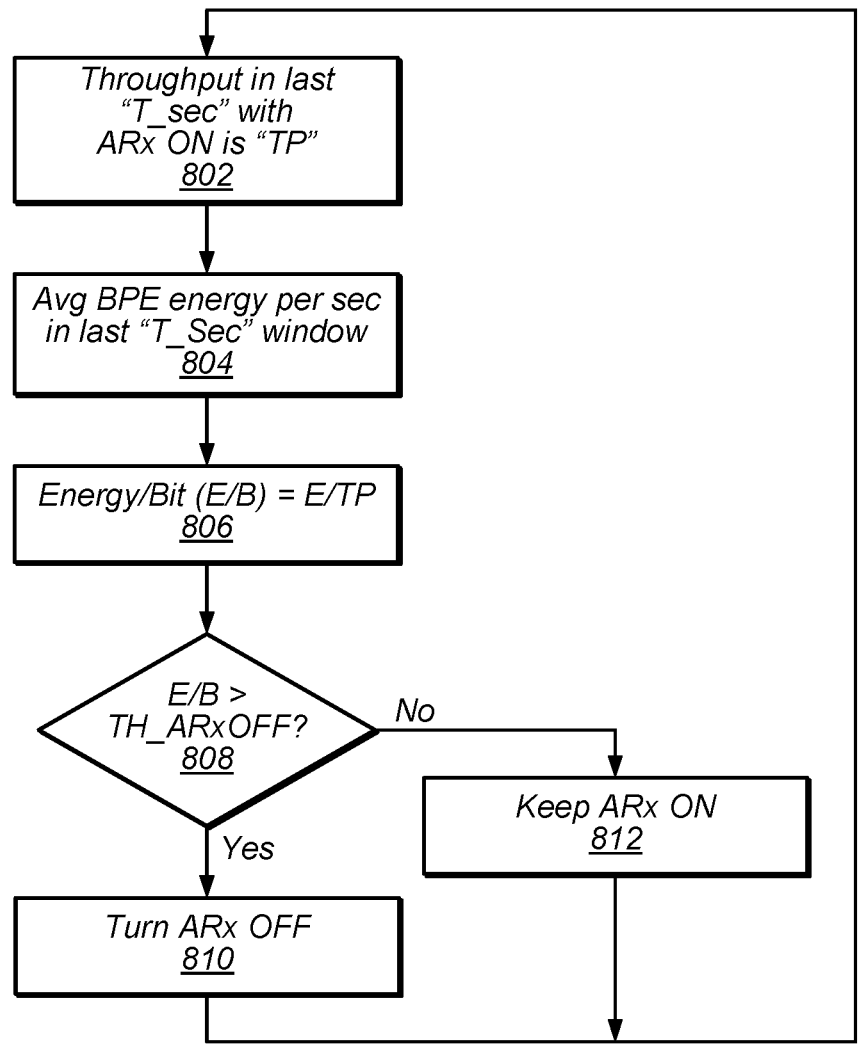
FIG. 8 is a flowchart diagram illustrating possible aspects of the exemplary method of FIG. 5, according to some embodiments.

FIG. 8 is a flowchart diagram illustrating additional exemplary possible aspects of the method of FIG. 5, according to some embodiments. In particular, the method of FIG. 8 may be used, as part of a baseband power consumption feedback mechanism for improving baseband operation based on real-time baseband power consumption estimation information, to determine whether to turn off or leave on an advanced receiver ("ARx") feature that is currently on.

The scheme shown in FIG. 8 may be used in conjunction with any of the computer systems or devices shown in the above Figures, among other devices. According to some embodiments, the methods may be implemented by a wireless device (e.g., a UE 106 such as illustrated in and described with respect to FIGS. 1-3). In various embodiments, some of the elements of the scheme shown may be performed concurrently, in a different order than shown, substituted for by other elements, or may be omitted. Additional elements may also be performed as desired.

In 802, the average baseband data throughput over a specified period of time "T_sec" (e.g., a value on the order of seconds) during which the ARx feature was on may be determined. This average throughput may be referred to as "TP".

In 804, the average energy used per second, as estimated using baseband power estimation (BPE), over the specified period of time T_sec may be determined. This average energy used may be referred to as "E".

In 806, the estimated energy per bit communicated over the T_sec window may be calculated by dividing E by TP.

In 808, the calculated E/B may be compared with a threshold "TH_ARxOFF". The E/B threshold for turning ARx off can be predetermined/characterized based at least in part on current RF conditions, operating mode, etc, and/or can be determined based at least in part on an E/B estimation from a most recent period (e.g., of a similar or different length than T_sec) during which ARx was off. At least according to some embodiments, the E/B threshold for turning ARx off may be selected such that ARx remains on if the E/B with ARx on is expected to be lower than the E/B with ARx off, while ARx is turned off if the E/B with ARx on is expected to be higher than the E/B with ARx off.

If the calculated E/B is greater than TH_ARxOFF, the method may proceed from step 808 to step 810, in which ARx may be turned off. If the calculated E/B is lesser than TH_ARxOFF, the method may proceed from step 808 to step 812, in which ARx may remain on.

Note that a similar flowchart may apply to the case in which ARx is off during the evaluation period (e.g., T_sec), and turning ARx on may result in a lower E/B. The value of TH_ARxOFF may be the same or different between the two scenarios, as desired.

Figure 9:
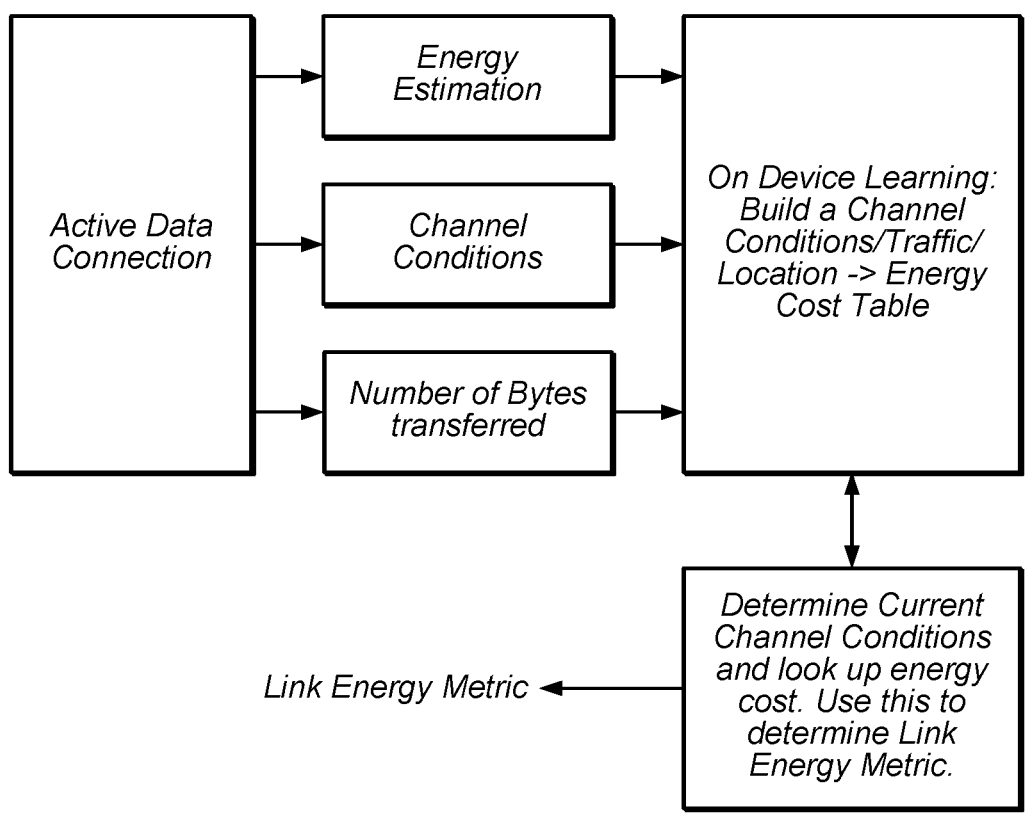
FIGS. 9-10 illustrate example aspects of possible techniques for performing on-device learning based on estimating baseband power consumption, according to some embodiments.

FIG. 9 is a block diagram illustrating an exemplary logical flow for performing on-device learning to estimate what link energy usage would be based on current conditions at a wireless device, according to some embodiments.

As shown, information regarding energy consumption (e.g., from a baseband power consumption estimating module), channel conditions, and the amount of data (e.g., number of bytes) transferred may be collected by an on-device learning algorithm when the wireless device has an active data connection. Note that other information (e.g., location, time, etc.) associated with such information may also be gathered by the on-device learning algorithm, as desired.

The on-device learning algorithm may generate an energy cost table or database indicating estimated link energy usage values for various combinations of conditions that might be experienced by the wireless device, based on the information collected regarding historical energy usage under various conditions. For example, the energy cost table/database might indicate an estimated link energy cost for a hypothetical wireless link that operates at each possible combination of values for a range of possible values for each of channel conditions, load conditions, and locations.

Thus, by determining the current channel conditions, load conditions, and location of the wireless device, the wireless device may in turn be able to determine a link energy metric value for the wireless device using (e.g., looking up the current conditions in) such an energy cost table/database. Such a metric may be used to select baseband operation timing opportunistically, e.g., to perform data communication when the value of the link energy metric is favorable, and/or to defer data communication when the value of the link energy metric is unfavorable. Similarly, such a metric may be used by higher layer (e.g, application, network, and/or transport layers) operations to opportunistically perform network data exchanges when the link energy metric is favorable, and/or to defer network data exchanges when the value of the link energy metric is unfavorable.

Note that since the data used to generate the energy cost table/database may be collected from the device itself, the energy cost estimates may be device specific. For example, as the energy cost table/database may be based on data resulting from the particular habits and patterns of use of the wireless device, the link energy metric values may more closely represent the actual link energy efficiency experienced by the wireless device than a generic energy cost table/database generated in aggregate might, at least according to some embodiments.

Figure 10:
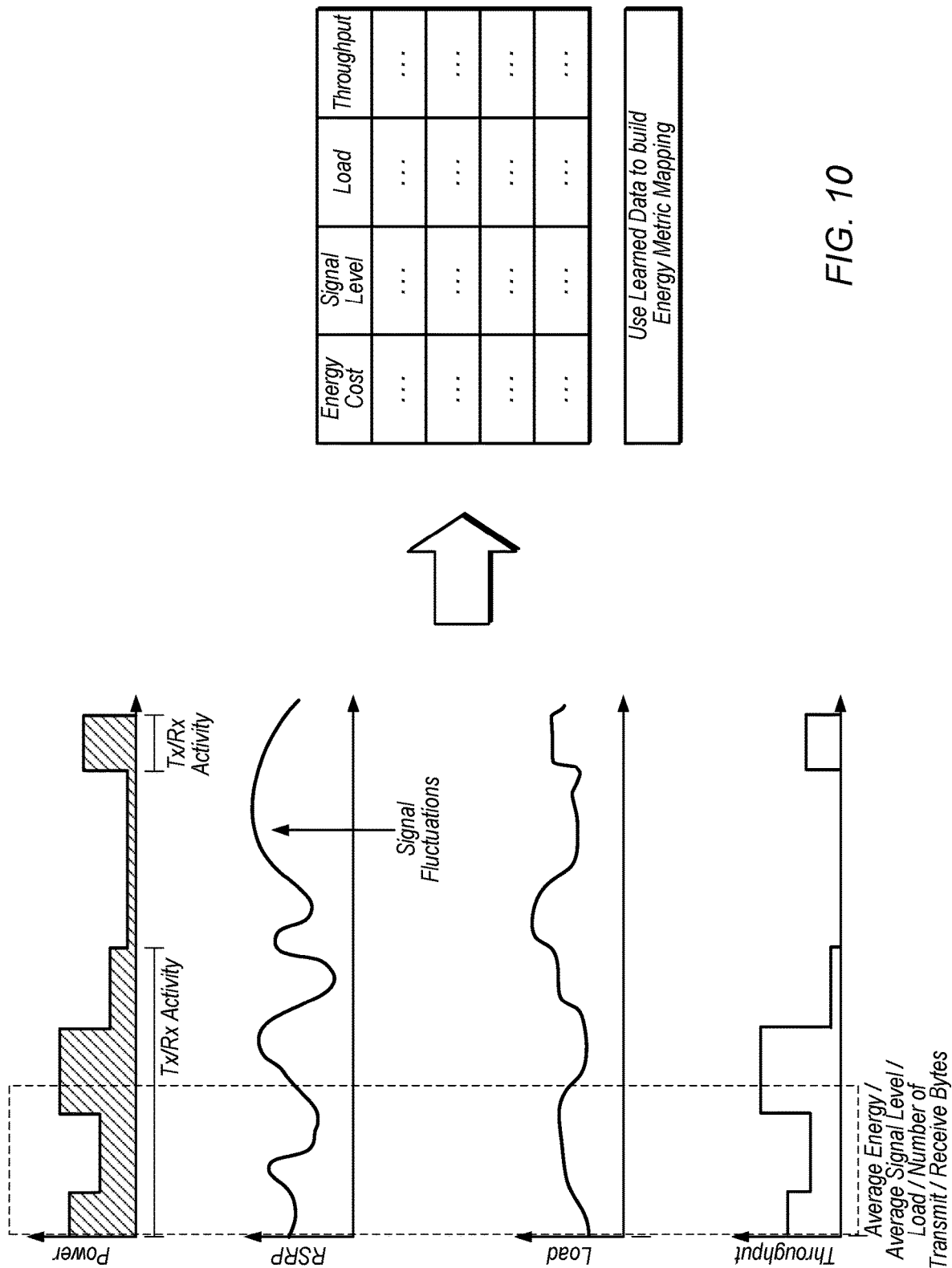

FIG. 10 further illustrates exemplary aspects of a possible on-device learning algorithm that estimates what link energy usage would be based on current conditions at a wireless device, according to some embodiments.

An active data connection may have numerous characteristics that vary over time, including power consumption, signal level (e.g., RSRP in LTE), serving cell load, and throughput, among other possible characteristics. The graphs illustrated in FIG. 10 illustrate possible value variations for such characteristics over an example time sample.

A learning algorithm may accumulate associated sample values of such characteristics as the data connection is used at different times, in different places, for different types of data exchange, etc. The learning algorithm may use one or more learning techniques (such as a genetic algorithm, among various possibilities), to analyze how the variations in values of such characteristics are correlated together based on the obtained sample values for such characteristics, and thereby build a table (as shown) or other model to build an energy metric mapping indicating an expected energy cost per data communicated under various possible conditions with respect to the characteristics monitored.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a user equipment device (UE) to:
estimate a power and/or energy consumption associated with downlink communication activity using a first receiver configuration for an active connection of the UE;
select, based on the estimated power and/or energy consumption, a second receiver configuration for the active connection of the UE for a first time period, wherein the second receiver configuration for the active connection of the UE is different from the first receiver configuration for the active connection of the UE; and
receive, during the first time period, a downlink communication using the second receiver configuration for the active connection of the UE.

2. The apparatus of claim 1, wherein the power and/or energy consumption is the power and/or energy consumption of a baseband processor of the UE.

3. The apparatus of claim 1, wherein selecting the second receiver configuration includes determining whether to activate or deactivate an advanced receiver function.

4. The apparatus of claim 3, wherein the advanced receiver function relates to interference mitigation.

5. The apparatus of claim 1, wherein selecting the second receiver configuration includes adjusting a modem clocking mechanism.

6. The apparatus of claim 1, wherein the power and/or energy consumption is based at least in part on cellular radio access conditions at a receiver of the UE.

7. A power control apparatus, comprising:
a processor configured to cause a wireless user equipment device (UE) to:
determine current channel conditions associated with an active connection;
determine current load conditions associated with the active connection;
determine, based on the current channel conditions and the current load conditions, an estimated energy and/or power cost of cellular communication for the active connection; and
reduce, based on the estimated energy and/or power cost, power consumption of a baseband processor for the active connection of the UE during a time period.

8. The power control apparatus of claim 7, wherein the estimated energy and/or power cost is based at least in part on baseband data throughput.

9. The power control apparatus of claim 8, wherein the estimated energy and/or power cost is further based on power modifying characteristic features identified as being active during an estimation window.

10. The power control apparatus of claim 9, wherein the estimated energy and/or power cost in a particular estimation window is compared to a value, wherein the value is based on historical values for one or more of baseband power consumption, baseband data throughput, load conditions, wireless medium conditions, location, or time.

11. The power control apparatus of claim 7, wherein to reduce power consumption includes deactivating an advanced receiver function that implements an interference mitigation technique.

12. The power control apparatus of claim 7, further configured to cause the UE to:
determine, based on the estimated energy and/or power cost, to modify one or more of:
bandwidth used;
transport block size;
the transmit power used;
whether carrier aggregation/dual carrier is enabled or disabled;
a diversity path used;
whether continuous packet connectivity (CPC) is active; or
a discontinuous reception (DRX) configuration.

13. The power control apparatus of claim 7, wherein the estimated energy and/or power cost is associated with receiving data using a first cellular radio access technology associated with the active connection, wherein the baseband processor communicates using the first cellular radio access technology associated with the active connection during the time period.

14. A power module, comprising:
a processor configured to:
receive information relating to baseband power consumption from at least one baseband source of a current connection of a user equipment device (UE);
estimate a first expected baseband power consumption of the current connection of the UE;
compare the first expected baseband power consumption to a threshold; and
based on the comparison:
disabling, in response to a determination that the expected baseband power consumption exceeds the threshold, a first receiver function for the current connection of the UE; or
enabling, in response to a determination that the expected baseband power consumption is below the threshold, the first receiver function for the current connection of the UE.

15. The power module of claim 14, wherein the threshold is selected so that:
the first receiver function is disabled if a second expected baseband power consumption of the UE with the first receiver function disabled is less than the first expected baseband power consumption; and
the first receiver function is enabled if a third expected baseband power consumption of the UE with the first receiver function enabled is less than the first expected baseband power consumption.

16. The power module of claim 14, wherein the first expected baseband power consumption is expected for a first time period, wherein said enabling or said disabling is for the first time period.

17. The power module of claim 14, wherein the first expected baseband power consumption of the UE is based on receiver functions of the UE active during an estimation window.

18. The power module of claim 14, wherein the threshold is based on historical values for one or more of:
baseband power consumption;
baseband throughput;
load conditions;
wireless medium conditions;
location; or
time.

19. The power module of claim 14, wherein the processor is further configured to determine, based on the first expected baseband power consumption whether to modify one or more of:
bandwidth;
transport block size;
transmit power;
carrier aggregation;
diversity path;
continuous packet connectivity; or
discontinuous reception.

20. The power module of claim 14, wherein the processor is further configured to provide the first expected baseband power consumption to at least one client.

* * * * *